United States Patent [19]
Appelgren

[11] 3,949,286
[45] Apr. 6, 1976

[54] DIGITAL POSITION CONTROL
[75] Inventor: James W. Appelgren, Highland Park, Ill.
[73] Assignee: Dynapar Corporation, Gurnee, Ill.
[22] Filed: Nov. 5, 1974
[21] Appl. No.: 521,061

[52] U.S. Cl. ............... 318/571; 318/601; 318/603; 318/604; 318/696
[51] Int. Cl.² ........................................ G05B 19/20
[58] Field of Search ........... 318/561, 571, 572, 591, 318/603, 600, 601, 602, 604, 696

[56] References Cited
UNITED STATES PATENTS

| | | | |
|---|---|---|---|
| 2,885,613 | 5/1959 | Myracle et al. | 318/604 |
| 2,928,033 | 3/1960 | Abbott | 318/604 |
| 3,206,665 | 9/1965 | Burlingham | 318/603 X |
| 3,308,279 | 3/1967 | Kelling | 318/571 X |
| 3,411,058 | 11/1968 | Madsen et al. | 318/696 |
| 3,479,574 | 11/1969 | Kosem | 318/571 |
| 3,665,280 | 5/1972 | Payne et al. | 318/572 |
| 3,676,760 | 7/1972 | McDaniel | 318/571 |
| 3,752,969 | 8/1973 | Kiffmeyer et al. | 318/601 X |
| 3,795,851 | 3/1974 | Gage et al. | 318/600 X |
| 3,828,168 | 8/1974 | O'Callaghan et al. | 318/601 X |

Primary Examiner—Gene Z. Rubinson
Attorney, Agent, or Firm—Andrus, Sceales, Starke & Sawall

[57] ABSTRACT

A digital position control for linearly moving apparatus driven by a motor includes a command signal generating loop coupled to a motor operative condition control loop. The command signal generating loop provides a digital pulse train signal having frequency characteristics corresponding to the desired accelerations and velocities of the apparatus and a total number of pulses proportional to the desired movement of the apparatus. The motor operative condition control loop employs the command signal to energize the motor in accordance with the frequency and pulse count characteristics of the command signal.

22 Claims, 5 Drawing Figures

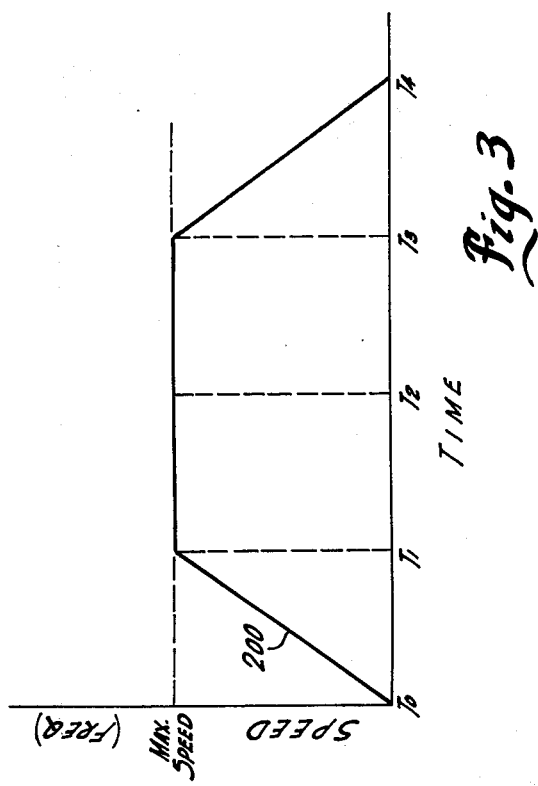
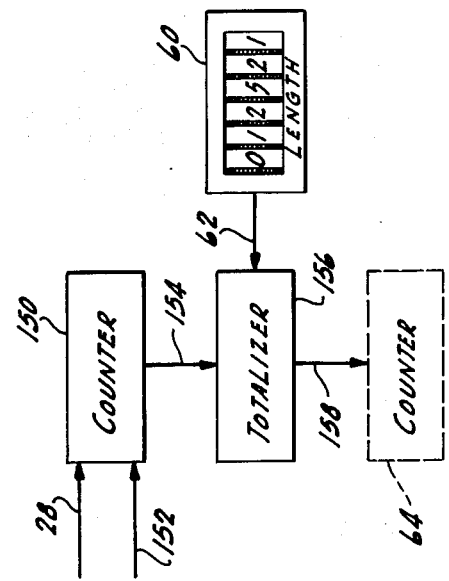
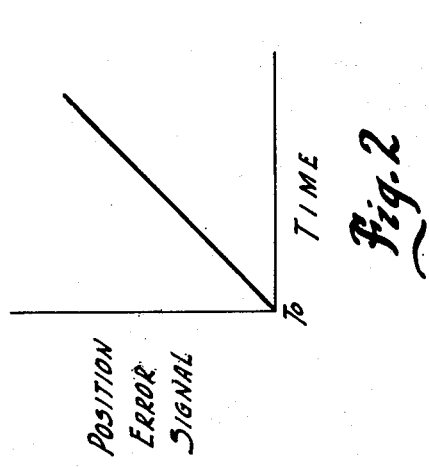
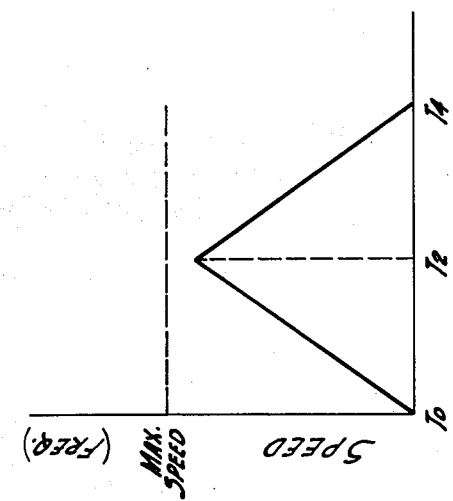

DIGITAL POSITION CONTROL

BACKGROUND OF THE INVENTION

Many applications exist in which it is desired to precisely and rapidly move an element. For example, it may be desired to move the element from one location to another in the shortest period of time and to locate the element at the end of such move with a high degree of precision. Such applications may include machine tools in which it is desired to move a cutting tool, such as a drill, to a precise location for drilling a hole. Numerous other applications, such as cut-to-length apparatus and press feeders, exist.

Various types of drives have been devised to provide such movement and location. In the past, however, problems have arisen with the drives. Among these problems are the instabilities attendant the various control loops found in such drives including the inability to adjust one physical or electronic aspect, such as acceleration, maximum speed, or amplification, without causing a deterioration in the performance of the drive or without requiring compensating adjustment in all the control aspects.

Prior art devices have failed to use the full horsepower capabilities of the drive motor. This has reduced operating speeds and times or required oversizing of the motor to provide adequate operating characteristics.

SUMMARY OF THE PRESENT INVENTION

Among the advantages of the present invention are the provisions of a control in which maximum speeds, acceleration and deceleration rates, and control loop gain are all independent. Adjusting one does not affect the other. This avoids the problems of instability which has been encountered in prior art controls and enables optimization between the stability and position error, for example.

The digital position control of the present invention accelerates and decelerates the drive in a manner such as to provide approximately constant current to the drive, thereby utilizing the full horsepower capability of the drive. The digital position control of the present invention also provides the fastest possible move between two points within the acceleration and velocity characteristics programmed into the control.

Briefly, the present invention is directed to an improved digital position control for energizing a drive motor coupled to, and moving, apparatus. The digital position control includes a command signal generating loop. A pulse generating means provides a variable frequency pulse train signal at its output. Each pulse of the signal represents a preselected increment of movement of the apparatus. The pulse generating means alters the frequency of the pulse train signal to provide desired acceleration and speed characteristics to the motor and apparatus.

An acceleration control means is coupled to the pulse generating means for operating the pulse generating means to alter the frequency of the pulse train signal up to a limit established by a maximum speed control. A feedback means, coupled to the output of the pulse generating means, operates the acceleration control means in accordance with the number of pulses generated in the pulse train signal to decelerate to the motor as the end of the move approaches.

The motor operative condition control loop includes an error accumulator means coupled to the pulse generating means. A pulse transducer, coupled to the motor, provides a digital pulse train signal responsive to the incremental rotation of the motor and movement of the apparatus. The error accumulator means ascertains the difference in pulses received in the output signal of the pulse generating means and the pulse transducer for providing an error signal corresponding to the difference. A digital-to-analog converter is coupled to the error accumulator means for providing an analog error output signal to an amplifier. A speed feedback means is coupled to the motor for providing a speed stabilizing feedback signal to the amplifier. The output of the amplifier is applied to the motor for providing a torque producing motor current for energizing the motor and moving the apparatus.

BRIEF DESCRIPTION OF THE DRAWING

FIG. 2 is a graph of position error with respect to time produced under accelerating conditions by the digital position control of the present invention.

FIG. 3 is a graph of speed characteristics with respect to time produced by operation of the digital position control of the present invention.

FIG. 4 is a graph, similar to FIG. 3, showing operation of the control in a short move during which maximum speed is not obtained.

FIG. 5 is a partial schematic diagram of circuitry for providing absolute positioning.

DESCRIPTION OF THE PREFERRED EMBODIMENT

Digital Position Control

Figure 1:
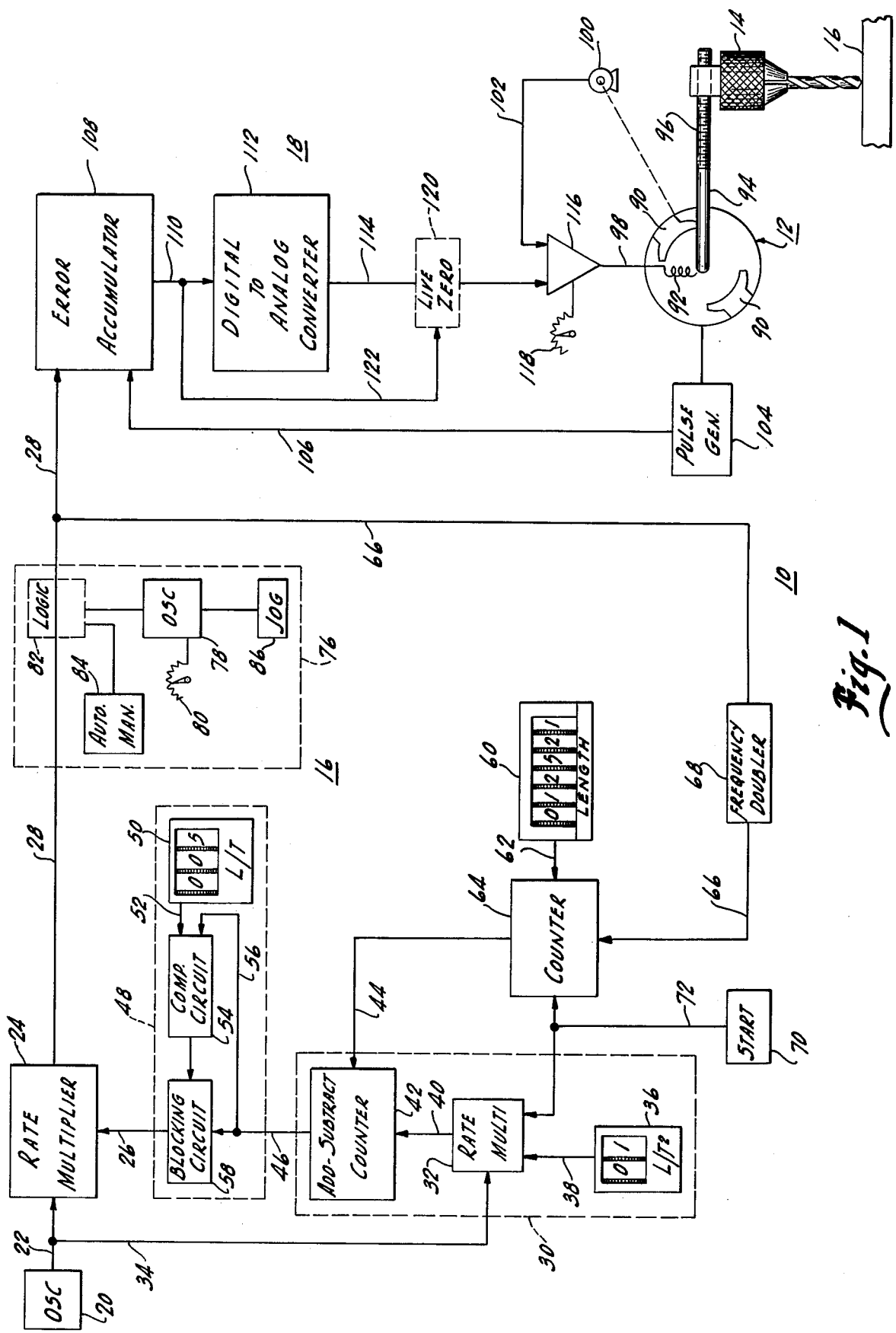
FIG. 1 is a schematic diagram of the improved digital position control of the present invention including the motor energized by the control and the apparatus driven by the motor.

Turning now to the Figures, there is shown in FIG. 1, digital position control 10 of the present invention. Digital position control 10 energizes motor 12 coupled to apparatus 14, such as a machine tool drill head, for controlling the acceleration, velocity, and linear movement and positioning of the apparatus. In a typical application, digital position control 10 determines the position of the drill head with respect to work piece 16 and the location at which holes are drilled in workpiece 16 by the drill head.

Digital position control 10 includes a pair of serially connected control loops, termed herein the command signal generating loop 16 and the motor operative condition control loop 18. As its name implies, command signal generating loop 16 provides a digital pulse train signal having frequency characteristics corresponding to the acceleration and velocity characteristics desired in the operation of motor 12 and apparatus 14 and a total number of pulses proportional to the desired movement of apparatus 14. For this purpose, each pulse in the signal represents a certain increment of movement of apparatus 14 such as 0.001 inch. The movement of apparatus 14 may be referenced to the previous position of the apparatus or to an appropriate index point.

Motor operative condition control loop 18 employs the digital pulse train command signal of loop 18 to energize motor 12 in accordance with the frequency and pulse count characteristics of the command signal to provide the desired movement to apparatus 14. Motor operative condition control loop 18 also insures that the operative conditions desired in motor 12 and apparatus 14 are actually obtained.

COMMAND SIGNAL GENERATING LOOP

A base frequency oscillator 20 provides a high frequency digital pulse train signal of, for example, 1 mHz, in conductor 22. The digital pulse train signal in conductor 22 is provided to a signal responsive means 24 for altering the frequency of the signal. While numerous means may be employed for this purpose, such as frequency dividers and the like, the circuitry commonly termed a rate multiplier is present preferred.

Rate multiplier circuitry operates to multiply the frequency of an input signal by a multiplier less than 1 so as to provide an output signal of lesser frequency. This multiplication and frequency reduction is accomplished most commonly by pulse removal. Thus, if the multiplier is 0.5, every other pulse is removed from the input signal, resulting in an output signal having a frequency which is half that of the input signal.

The multiplier applied by rate multiplier 24 to the input signal in conductor 22 is determined by a digitally encoded control signal in conductor 26. The digital pulse train output signal of rate multiplier 24 in conductor 28 is the command signal to motor operative condition control loop 18. As noted, supra, the frequency of this digital pulse train command signal corresponds to the acceleration and velocity characteristics desired in the operation of motor 12 and apparatus 14 and the number of pulses in the signal is proportional to the desired movement of apparatus 14. Typically each pulse in the signal may represent 0.001 inch of movement of apparatus 14.

Acceleration and deceleration control circuit 30, hereinafter called acceleration control, provides a means by which the multiplying action of rate multiplier 24 may be altered. The high frequency digital pulse train signal in conductor 22 is provided to a second rate multiplier 32 in acceleration control 30 in conductor 34. The construction and operation of rate multiplier 32 may be the same as that of rate multiplier 24. The multiplying action of rate multiplier 32 is controlled in accordance with desired acceleration and deceleration rates by an input means, typically a plurality of ten position switches 36 which provide a digitally encoded signal in conductor 38 to rate multiplier 32. The digitally encoded signal may typically be a parallel binary encoded decimal number.

The signal in conductor 38 determines the multiplying action of the rate multiplier. Switches 36 enable the operator to insert desired accelerations of apparatus 22, such as inches/second$^2$ or feet/minute$^2$ directly in acceleration control 30. The output of rate multiplier 32 is an adjustable frequency digital pulse train signal in conductor 40.

The output signal of rate multiplier 32 in conductor 40 is provided to a signal responsive add-subtract counter 42. The operational mode of add-subtract counter 42, that is, whether the counter adds input pulses or subtracts input pulses, is determined by a control signal in conductor 44. Initially, counter 42 operates in the add mode so as to provide a continuously increasing totalized count responsive to the digital pulse train input signal in conductor 40. This totalized count signal is provided in conductors 46-26 to multiplier 24 to control the multiplier applied to the input signal in conductor 22 by the rate multiplier and the frequency of the output signal of conductor 28.

Maximum speed circuit 48 provides a digitally encoded signal which determines the maximum totalized count signal in conductor 26 which may be applied to rate multiplier 24 and thus the maximum frequency of the rate multiplier output signal in conductor 28. A plurality of ten position switches 50 may be used to provide a digitally encoded signal corresponding to desired maximum speed in conductor 52. The switches permit an operator to enter a number corresponding to the desired velocity of apparatus 14, such as inches/second or feet/minute directly in maximum speed circuit 48.

The signal in conductor 52 is provided to one input of digital comparison means 54. The other input to comparison means 54 is connected to the output of add-subtract counter 42 provided in conductors 46 and 56. The output of digital comparison means 54 is provided to blocking circuit 58. The operation of digital comparison means 54 and blocking circuit 58 is such that when the totalized count in add-subtract counter 42 equals the maximum speed signal in conductor 52, blocking circuit 58 operates to prevent any further alteration to the input signal to rate multiplier 24 in conductor 26. This blocking action fixes the multiplication factor of rate multiplier 24 and the frequency of digital pulse train output signal in conductor 28 at that corresponding to the maximum desired speed of motor 12 and apparatus 14.

Digital compaison means 54 may comprise coincident gating circuitry responsive to the input signals from add-subtract counter 42 and maximum speed switches 50. In the alternative, parallel add-subtract circuitry may be employed. Blocking circuit 58 may comprise a binary register. An output signal from comparison circuit 54 serves to retain the existing count in the register when maximum speed is reached.

Digital position control 10 also includes a means by which a magnitude of the desired move of apparatus 14 may be entered into the control. The means may comprise an additional plurality of ten position switches 60 which are manipulatable to provide a digitally encoded signal corresponding to the length of the desired move of apparatus 14 in conductor 62. In the alternative, a tape reader or some other input means may be employed. The signal in conductor 62 is provided to, and registered in, presettable counter 64. The second input signal to counter 64 is a digital pulse train signal which causes the counter to count down from the preset number established by the signal in conductor 62 to zero. This digital pulse train input signal is provided from conductor 28 to counter 64 in conductor 66 in the manner of the feedback signal. The digital pulse train signal in conductor 66 is passed through frequency doubler 68 interposed in the conductor which doubles the frequency of the pulse train signal. This causes counter 64 to reach zero when a number of counts corresponding to half of apparatus 14 have appeared in conductor 28. In the alternative, a divide by two circuit may be provided in conductor 28 at the output of command signal generating loop 16. Conductor 66 provides an undivided signal to counter 64 under such circumstances.

The output of presettable counter 64 is provided in conductor 44 and is the input signal to add-subtract counter 42 which switches the counter from the add mode to the subtract mode, and vice versa.

A start button 70 is included in command signal generating loop 16 to provide a signal in conductor 72 which initiates the operation of rate multiplier 32 in acceleration control 30 and enters the signal in conductor 62 in counter 64 when the operation of digital position control 10 is desired.

A jog or inch circuit 76 may also be included in digital position control 10. Such circuitry may include oscillator 78, the frequency of the pulse train signal of which determines the jog feed rate. The frequency of oscillator 78 may be adjusted by potentiometer 80. Logic circuit 82, operable by "auto" or "manual" switch 84, is interposed in conductor 28. If it is desired to jog digital position control 10, switch 84 is operated to connect oscillator 78 to conductor 28 so that the digital pulse train signal of oscillator 78 becomes the command signal to loop 18. Jog button 86 energizes oscillator 78 to provide the digital pulse train signal in conductor 28.

MOTOR OPERATIVE CONDITION CONTROL LOOP

Motor 12, operated by digital position control 10, may be of output current type having permanent magnetic poles 90 and a rotating armature coil 92 mounted on outout shaft 94. Output shaft 94 contains lead screw 96 for providing linear motion to apparatus 14. Armature coil 92 is connected through a commutator, not shown, to conductor 98. The magnitude of the armature current in conductor 98 determines the speed of motor 12. Tachgenerator 100 provides an analog speed feedback signal in conductor 102. If desired, hydraulic apparatus may be employed. Such apparatus would typically comprise a hydraulic motor coupled to a source of pressurized hydraulic fluid through an electrically operated servo valve.

The number of rotations of motor 12 determines the distance traversed by apparatus 14. Digital position control 10 includes rotary pulse transducer 102 connected to output shaft 94 of motor 12 for providing a pulse in conductor 106 for each preselected increment of rotation of motor 12. The number of such pulses generated is an indication of the amount of rotary movement of motor 12 and the linear movement of apparatus 14. Normally, rotary pulse transducer 104 is selected to provide a pulse for the same increment of movement as is represented by one pulse in the command signal in conductor 28. This may, for example, be one pulse for each 0.001 inch of movement of apparatus 14.

Conductor 28 containing the command signal is connected to one input of error accumulator circuit 108. Conductor 106 containing the digital pulse train feedback signal is connected to another input of the error accumulator circuit. Error accumulator circuit 108 receives and compares the number of pulses received in the feedback signal in conductor 106 with the number of pulses received in the command signal to the end that the actual movement of apparatus 14 as indicated by the feedback signal in conductor 106 must equal the movement commanded by the command signal in conductor 28. When apparatus 14 has moved to, and is in, the command position, the number of pulses received from each source will be equal. Anytime a condition of signal equality does not exist, error accumulator circuit 108 energizes motor operative condition control loop 18 to operate motor 12 in a manner which establishes a condition of signal equality.

Error accumulator circuit 108 may comprise an add-subtract counter. The digital pulse train signal in conductor 28 operates the counter in one mode, for example, the add mode, while the digital feedback signal in conductor 106 operates the counter in the other mode, for example, the subtract mode. The output of error accumulator circuit 108 in conductor 110 is a digitally encoded signal indicative of the difference in the number of pulses received in conductor 28 and received in conductor 106.

The signal in conductor 110 may be either a positive difference or a negative difference, the polarity of the output signal being indicative of whether the actual position of apparatus 14 lags the commanded position or precedes the commanded position.

To reverse the direction of movement of apparatus 14, the connector of conductors 28 and 106 to error accumulator circuit 108 is reversed. This reverses the polarity condition of the output signal of the circuit.

The output signal of error accumulation circuit 108 in conductor 110 is provided to the input of digital-to-analog converter 112. Digital-to-analog converter 112 receives the digitally encoded input signal in conductor 110 and provides an analog output signal in conductor 114 the magnitude of which is proportional to the digital input signal. The polarity of the analog signal in conductor 114 is responsive to polarity of the difference signal in conductor 110 and may be either positive or negative depending on the desired direction of movement of apparatus 14.

The output of digital-to-analog converter 110 in conductor 114 is provided to one input of current amplifier 116. Amplifier 116 is typically a static electronic motor driver employing, for example, controlled rectifiers as power elements to provide motoring and regenerating operation in either direction of rotation of motor 12. If desired, a rotating amplifier may be employed.

The other input of current amplifier 116 is connected to conductor 102 containing the analog speed feedback signal from tach generator 100. The gain of current amplifier 116 may be adjustable, as by potentiometer 118 and the output of current amplifier 116 is provided in conductor 98 as the armature current to armature coil 92.

A live zero circuit 120 may be interposed in conductor 114 between digital-to-analog converter 112 and current amplifier 116. Live zero circuit 120 insures that a minimum signal level exists at the input of amplifier 116 as a zero condition is approached from either direction. This insures minimal output torque in motor 12 as apparatus 14 reaches the desired position and overcomes the increased friction encountered as a static condition is approached or attained. Live zero circuit may comprise a signal bias means. Live zero circuit 120 is connected to conductor 110 containing the output of error accumulator circuit 108 by conductor 122. When the count in error accumulation circuit is +1 or −1, a gate circuit connected to the bias means of live zero circuit 120 may be operated to provide the minimal signal level to the reference input of current amplifier 116.

OPERATION

To operate digital pulse control 10, the amount of movement desired of apparatus 14 is entered into the control, as by manipulating switches 60. For example, a move of 12.521 inches may be entered in switches 60, as shown in FIG. 1. An appropriate digitally encoded signal, corresponding to this number is provided in conductor 62.

The desired acceleration and deceleration rate signal is similarly provided by switches 36, for example, 1 inch/second$^2$, and the desired maximum speed signal is provided by switches 50, for example, 5 inches/second.

Oscillator 20 provides the high frequency digital pulse train signal in conductor 22. Rate multiplier 24 is inoperative so that the multiplier applied to the input signal is zero and there is thus no output signal in conductor 28.

Start button 70 is operated to enter the digitally encoded length of movement signal in conductor 62 into preset counter 64. Assuming each pulse in conductor 28 represents 0.001 inches of movement this would be 12,521 counts. Start button 70 also energizes rate multiplier 32. Rate multiplier 32 multiplies the high frequency digital pulse train signal in conductor 32 by a multiplier selected in accordance with the signal in conductor 38 and the desired acceleration. The result is an appropriate lower frequency output signal in conductor 40. For a given acceleration rate, the multiplying action of rate multiplier 32 remains constant as does the frequency of the digital pulse train output signal in conductor 40.

It may be assumed that the signal in conductor 44 to add-subtract counter 42 is such as to cause counter 42 to operate in the add mode. Counter 42 receives the pulses in conductor 40 and provides a continually increasing summation of the pulses of this signal. The output of add-subtract counter 42 is provided as a digitally encoded signal in conductors 46–26 to rate multiplier 24.

This signal to rate multiplier 24 causes the rate multiplier to apply a multiplication factor to the high frequency digital pulse train signal in conductor 22. This multiplier causes a low frequency digital pulse train output signal to appear in conductor 28. As the digitally encoded signal in conductor 26 increases, in accordance with the increasing totalized count in add-subtract counter 42, the multiplier applied to the high frequency digital pulse train input signal in conductor 22 similarly increases, resulting in an increasing frequency in the digital pulse train output signal in conductor 28. The rate of increase in the digital pulse train signal in conductor 28 corresponds to the desired acceleration of apparatus 14.

The digital pulse train signal in output conductor 28 is provided to error accumulator circuit 108 in motor operative condition control loop 18. In the absence of a feedback signal in conductor 106 from rotary pulse generator 104, the add-subtract counter which comprises error accumulator 108 operates in the add mode to provide a continually increasing digital pulse count in conductor 110 to digital-to-analog converter 112. Digital-to-analog converter 112 provides a correspondingly increasing analog signal in conductor 114 to current amplifier 116. In the absence of a speed feedback signal in conductor 102 from tachometer generator 100, current amplifier 116 provides a corresponding current signal in conductor 98, the magnitude of which is dependent on the gain of current amplifier, as established by potentiometer 118.

The armature current supplied to armature coil 92 by conductor 98 causes output shaft 94 of motor 12 to commence rotating. It similarly causes the rotation of lead screw 96 and the linear movement of apparatus 14.

The torque generated by motor 12 is proportional to the armature current in conductor 98, which in turn is proportional to the output of digital-to-analog converter 112, the output of error accumulator circuit 108, and ultimately the frequency of the digital pulse train signal in conductor 28. Inasmuch as the frequency of the digital pulse train signal in conductor 28 is increasing, due to the increasing multiplier applied to rate multiplier 24, the torque and the acceleration of motor 12 and apparatus 14 are similarly increasing.

Upon the commencement of rotation of motor 12, pulse transducer 104 commences to provide a digital pulse train signal in conductor 106. This is applied to the add-subtract counter comprising error accumulator circuit 108 to operate the add-subtract counter in the subtract mode. This reduces the totalized pulse count in error accumulator circuit 108 and the signal in conductor 110. The result is a digitally encoded position and overall speed error signal in conductor 110, and a corresponding analog error signal in conductor 114. This error signal forms the reference signal to current amplifier 116 and a speed stabilizing control loop which operates within the above described position control loop. The speed feedback signal in conductor 102 to current amplifier completes this speed stabilizing loop. Inasmuch as rate multiplier 32 in acceleration control circuit 30 is providing a constant frequency digital pulse train signal in conductor 40 to add-subtract counter 42, the totalized count in that counter is numerically increasing at a constant rate. The output signal in conductors 46-26 and the multiplier applied by rate multiplier to the input signal in conductor 22 are similarly increasing linearly with time.

FIG. 2 is a graph showing the magnitude of the error signal in conductors 110 and 114 with respect to time, under conditions of acceleration in motor 12. The magnitude of this signal, similar to the command signal in conductor 28, is linearly increasing with respect to time. The signal in conductor 114 forms the reference signal to amplifier 116 and causes an increase in motor speed which is linear with respect to time. See time period $T_. - T_1$ of FIG. 3. As motor 12 accelerates, a CEMF is generated by the rotation of the armature through the motor field. This CEMF is proportional to speed and hence increases linearly with respect to time. The current in armature 72 arises from the difference between the applied voltage in conductor 98 and the CEMF of the motor and remains constant at the preselected maximum value due to the common linearly increasing properties of both the applied voltage and the CEMF. This use of constant current provides constant torque and highly efficient operation to motor 12.

The output signal in conductor 46 from add-subtract counter 42 is provided in conductor 56 to digital comparison circuit 54. When the magnitude of the signal in conductor 56 equals the magnitude of the signal in conductor 52, corresponding to maximum desired speed of motor 12 and apparatus 14, digital comparison circuit 54 operates blocking circuit 58 to retain the digitally encoded input signal in conductor 26 to rate multiplier 22 at that corresponding to the maximum desired speed. This similarly fixes the multiplier applied by rate multiplier 24 to the input signal in conductor 22 and renders constant the frequency in conductor 28.

The constant frequency in conductor 28 applied to motor operative condition control loop 18, causes that loop to drive motor 12 and apparatus 14 at constant speed. Digital comparison circuit 54 may operate blocking circuit 58 at time $T_1$ in FIG. 3. The energization of blocking circuit 58 does not alter the operation of add-subtract counter 42. This counter continues to totalize the input pulses received from the digital pulse train signal in conductor 40. However, the signal provided by conductor 26 to rate multiplier 24 is fixed.

As pulses appear in conductor 28, a feedback signal is provided to presettable counter 64 in conductor 66 through frequency doubler 68. The signal in conductor 66 causes counter 64 to count down. Inasmuch as the frequency of the feedback signal in conductor 66 is doubled by doubler 68, presettable counter 64 will reach a zero count when the number of counts in the output signal in conductor 28 equals half the total number of counts required for the desired movement of apparatus 14. This may occur at time $T_2$.

When presettable counter 64 reaches the zero condition, as at time $T_2$, an output signal is provided in conductor 44 to add-subtract counter 42 which causes that counter to switch from the add mode to the subtract mode. The pulses provided in conductor 40 to counter 42 are then subtracted from the count contained in the counter just prior to the application of the signal in conductor 44.

As the subtraction of pulses in conductor 40 continues, a point will be reached at which the digitally encoded signal in conductor 56 becomes less than the signal in conductor 52. This may occur at time $T_3$. This causes the operation of blocking circuit 58 to cease. The output signal in conductor 46 is again applied through input conductor 26 to rate multiplier 24. The signal in conductor 46 is now a continually decreasing digitally encoded signal. This causes a similar reduction in the multiplier applied by rate multiplier 24 to the input signal in conductor 22. The result is a reduction in the frequency of the output signal in conductor 28. This reduction initiates the deceleration of motor 12 and apparatus 14 in a manner analogous to that in which acceleration was obtained. The constant current operation of motor 12, noted in acceleration continues in deceleration conditions.

When the count in add-subtract counter 42 reaches zero, the multiplier applied by rate multiplier 24 to the input signal in conductor 24 similarly reaches zero. This terminates the command signal in conductor 28 to error accumulator circuit 108. Error accumulator 108 continues to operate motor operative condition control loop 18 until the number of pulses received in conductor 106 from rotary pulse generator 104 equals the number of pulses provided in conductor 28. Thereafter the operation of motor operative control loop ceases at time $T_4$ and apparatus is in the desired position.

For short moves, motor 12 and apparatus 14 may never achieve the maximum speed established by switches 50. Under such conditions, the digitally encoded output signal in conductor 46-56 from add-subtract counter 42 never equals the signal in conductor 52 so that the blocking action of blocking circuit 58 is never initiated.

As in longer moves, add-subtract counter 42 initially provides a continually increasing output signal in conductor 46-26 to rate multiplier 24 responsive to the input signal from rate multiplier 32. This increases the frequency of the digital pulse train command signal in conductor 28 and accelerates motor 12 and apparatus 14.

When counter 64 indicates that a number of pulses corresponding to half the desired movement of apparatus 14 has been provided in conductor 28, the signal in conductor 44 switches add-subtract counter from the add mode to the subtract mode. This causes the signal from add-subtract counter 42 to conductors 44-26 to decrease, responsive to the input signal from rate multiplier 32. This reduces the frequency of the digital pulse train signal in conductor 28.

The result is that motor 12 accelerates until the mid point of the move has been reached at $T_2$ in FIG. 4 and thereafter decelerates as apparatus 14 approaches the end of the move at $T_4$ in FIG. 4.

If it is desired to control the movement of apparatus 14 from an index point, the additional circuitry shown in FIG. 5 may be employed. An add-subtract counter 150 receives the command signal in conductor 28. A second input signal in conductor 152 provides an indication of the commanded direction of movement of apparatus 14 and determines the add-subtract mode of operation of counter 150. With apparatus 14 in the index position, counter 150 is zeroed. The signal in conductor 152 operates add-subtract counter 150 in either the add mode or the subtract mode so that, upon receiving the digital pulse train signal in conductor 28 commanding movement of apparatus 14 away from the index position, the counter establishes a count. The magnitude of this count is indicative of the displacement of apparatus 14 from the index position and its polarity in an indication of the direction of the displacement.

A digitally encoded output signal from counter 150 is provided in conductor 154 to totalizer 156. A second input to totalizer 156 is the signal in conductor 62 from switches 60. A polarity characteristic is given to the signal in conductor 62 to indicate the commanded direction of movement of apparatus 14. Totalizer 156 determines the magnitudinal and directional difference between the existing position of apparatus 14, as indicated by counter 150, and the commanded position, as indicated by switches 60, by algebraic summation and provides an appropriate digitally encoded signal to counter 64 in conductor 158 to control the amount and direction of movement of apparatus 14. In the embodiment of FIG. 5, switches 60 are used to indicate the commanded movement with respect to the reference point.

Various modes of carrying out the invention are contemplated as being within the scope of the following claims particularly pointing out and distinctly claiming the subject matter which is regarded as the invention.

I claim:

1. A digital position control for energizing a drive motor, coupled to and controlling the movement and position of apparatus, said control comprising:
   a command signal generating control loop including:
      pulse generating means providing a first pulse train signal at its output, each pulse of which represents a preselected increment of movement of said apparatus, said pulse generating means altering the frequency of the pulse train signal proportional to a bicondition input signal thereto;
   acceleration control means coupled to said pulse generating means and applying an input signal thereto for causing said pulse generating means to serially provide at least a first and a second alteration in the frequency of the pulse train signal in accordance with preselected acceleration characteristics desired of the apparatus, said acceleration control apparatus including means providing a second digital pulse train signal, the frequency of which corresponds to desired acceleration characteristics of the apparatus, and totalizing means for receiving said second digital pulse train signal and for providing a bi-condition varying signal to said pulse generating means;

pulse counting means coupled to the output of said pulse generating means and to said acceleration control means for switching the varying signal provided by said totalizing means between conditions responsive to the number of pulses generated in the pulse train signal; and a motor operative condition control loop including:

a pulse transducer coupled to the motor for providing a pulse train signal responsive to the incremental movement of the motor and apparatus;

error accumulator means coupled to said pulse generating means and to said pulse transducer for ascertaining the difference in pulses received in said signals and for providing a signal corresponding to said difference;

a digital-to-analog converter coupled to said error accumulator circuit for providing an analog output signal proportional to the difference signal;

a speed feedback means coupled to the motor for providing a speed feedback signal proportional to actual motor speed; and motor driver means coupled to said digital-to-analog converter for receiving said analog signal as a reference signal and to said feedback means for receiving said speed feedback signal, the output of said driver means being couplable to the motor for providing an output signal for energizing the motor and moving the apparatus.

2. The digital position control of claim 1 wherein said pulse generating means includes a base frequency oscillator and a means for altering the frequency of the base frequency oscillator to provide the pulse train output signal.

3. The digital position control of claim 2 wherein said pulse generating means includes a rate multiplier coupled to said base frequency oscillator for altering the frequency of the output signal of the oscillator in accordance with the signal from said acceleration control means to provide the first pulse train output signal.

4. The digital position control of claim 1 wherein said means providing the second digital pulse train signal comprises a rate multiplier coupled to a digital pulse train signal source.

5. The digital position control according to claim 4 wherein said rate multiplier means includes means for establishing the frequency of the second digital pulse train signal in accordance with desired acceleration characteristics.

6. The digital position control of claim 1 wherein said totalizing means comprises an add-subtract counter.

7. The digital position control of claim 6 wherein said pulse counting means is further defined as coupled to said add-subtract counter and as ascertaining when a number of pulses equal to a preselected portion of the movement of the apparatus has been generated for switching the counter between the add and subtract modes to switch the varying signal provided by the totalizing means between conditions.

8. The digital position control of claim 1 including the control means providing a signal corresponding to maximum speed of the motor; and comparison means interposed between said acceleration control means and said pulse generating means, said comparison means being coupled to said speed control means and said acceleration control means for receiving the signals therefrom, said comparison means limiting the signal applied to the pulse generating means from acceleration control means to that corresponding to the maximum speed signal.

9. The digital position control of claim 1 wherein said pulse counting means is further defined as coupled to said totalizing means and as ascertaining when a number of pulses equal to a preselected portion of the movement of the apparatus has been generated for operating said totalizing means to switch the varying signal provided by the totalizing means between conditions.

10. The digital position control of claim 9 wherein said pulse counting means further includes means providing a signal corresponding to the desired movement of the apparatus and means for comparing the number of pulses generated in the pulse train signal with the signal corresponding to desired movement for ascertaining when a number of pulses in the pulse train signal equal to a preselected portion of the movement of the apparatus has been generated.

11. The digital position control of claim 10 wherein said means providing a signal corresponding to the desired movement includes a counter presettable to the magnitude of the desired movement, and includes a feedback means from the output of said pulse generating means to said counter for providing a feedback signal to said counter for operating the counter to ascertain when the preselected portion of the movement of the apparatus has occurred, said control including frequency altering means for providing a desired frequency relationship between the feedback signal and the pulse train signal.

12. The digital position control of claim 11 wherein said feedback means includes said frequency altering means.

13. The digital position control of claim 11 wherein said frequency altering means is interposed between said command signal generating loop and said motor operative condition control loop.

14. The digital position control of claim 10 wherein said means providing a signal corresponding to the desired movement of the apparatus is further defined as including means for providing a signal corresponding to desired apparatus movement with reference to an index point.

15. The digital position control of claim 14 wherein said index point reference means includes means for providing a signal corresponding to the existing position of the apparatus with reference to the index point, means providing a signal corresponding to the desired movement of the apparatus with reference to the index point and means for providing an algebraic signal difference as the signal corresponding to the desired movement of the apparatus.

16. The digital position control of claim 12 wherein said frequency altering means comprises a frequency doubler.

17. The digital position control of claim 1 including a second pulse generating means selectively couplable to the motoroperative condition control loop for providing a digital pulse train signal having a frequency corresponding to a desired speed of the motor and apparatus.

18. The digital position control of claim 1 wherein said error accumulation circuit comprises an add-subtract counter operable in one mode by the pulse train signal from said pulse generating means and in the other mode by the pulse train signal from said pulse transducer.

19. The digital position control of claim 1 wherein said error accumulator means, said digital-to-analog converter, and said motor driver means are so constructed as to energize the motor in either direction of rotation.

20. The digital position control of claim 1 wherein said motor driver means is further defined as providing motoring and regenerative operation to the motor.

21. The digital position control of claim 1 wherein said motor driver includes means for adjusting the relationship between the input signal and the output signal.

22. The digital position control of claim 1 including a bias means interposed between said digital-to-analog converter and in said amplifier, said bias means being coupled to said error accumulation circuit for providing an input to said amplifier when the difference in pulses received by said error accumulator means approaches zero.

* * * * *